INVENTOR.
GÖSTA INGEMAR INGEMARSSON his ATTORNEYS

Oct. 1, 1968  G. I. INGEMARSSON  3,404,065
APPARATUS FOR CLEANING AND FRACTIONATING A PULP SUSPENSION
Filed Aug. 23, 1967  2 Sheets-Sheet 2

INVENTOR.
GÖSTA INGEMAR INGEMARSSON
BY
his ATTORNEYS

United States Patent Office 3,404,065
Patented Oct. 1, 1968

3,404,065
APPARATUS FOR CLEANING AND FRACTIONATING A PULP SUSPENSION
Gösta Ingemar Ingemarsson, Karlstad, Sweden, assignor to Aktiebolaget Karlstads Mekaniska Werkstad, Karlstad, Sweden, a company of Sweden
Filed Aug. 23, 1967, Ser. No. 662,754
Claims priority, application Sweden, Dec. 1, 1966, 16,452/66
7 Claims. (Cl. 162—233)

ABSTRACT OF THE DISCLOSURE

Apparatus for cleaning and fractionating a pulp suspension in which particles having higher sedimentation velocities and partices having larger dimensions than desired are separated and withdrawn from the suspension. The apparatus comprises a vessel having a cylindrical or frustoconical outer wall, a rotatable drum located in the vessel coaxially with the outer wall and carrying one or more screens, an inlet for introducing the suspension and outlets for withdrawing the reject and the accept portions. Rotation of the drum maintains a Couette flow in the suspension and causes particles having relatively high sedimentation velocities to be propelled outwardly toward the outer wall of the vessel by centrifugal forces. The outer ring of the Couette flow, which is thus made up of the reject portion, is withdrawn from the vessel. The remainder of the suspension, meanwhile, passes through the screen, thus separating out and leaving behind large particles for removal with the reject, and is withdrawn from a part of the vessel within the screen. The screen is kept clear by means of blades or vanes located within the screen which create pressure pulsations through the screen openings.

BACKGROUND OF THE INVENTION

This invention relates to apparatus for cleaning and fractionating suspensions of particles in liquids, such as pulp suspensions and, more particularly, to apparatus which simultaneously separates out both particles having higher sedimentation velocities than desired and particles having larger dimensions than desired.

In the preparation of pulp suspensions, unacceptable particles will invariably be present as a result of infiltration from the processing environments or because of the ineffectiveness of the production process to otherwise remove or exclude them. These unacceptable particles consist mainly of undefibered fiber bundles, pieces of bark, broken tiles from tile-lined processing equipment, sand and pipe scale, among other impurities. Fiber bundles and bark are representative of the types of particles that are of generally elongated shape and have densities that are approximately equal to the density of the fibers in the suspension. On the other hand, sand, rust and pieces of tile are generally spheroidal and have significantly higher densities than the fibers.

The propensity of fiber suspensions to entangle and form fiber networks tends to trap the unacceptable particles, which as discussed above vary considerably in form, type and dimension, and makes their removal very difficult. While by far the major proportion of the impurities are larger than the minimum cross-section of the fibers, a screen plate constructed with circular or elongated openings dimensioned so that they will not pass the impurities has such a low capacity per unit area of screen that it is of little practical value. Thus, screening is not a good answer to the problem of removing all such impurities.

Screening is used in pulp and paper production in different stages in the production process and may involve several steps in each stage. A complete pulp cleaning and fractionating process will involve coarse screening, fine screening in one or more steps, and processing through vortex cleaners in one or more steps. The function of the coarse screening step is primarily to eliminate the largest-sized impurities in the pulp suspension and to facilitate the fine screening. The fine screening accomplishes separation of elongated particles and those whose least cross-sectional area is larger than that of the largest fibers. The vortex cleaners will separate out the spherical-shaped impurities and those having specific gravities significantly higher than the fibers. In addition to the basic function that screens perform by removing impurities, screens are also used in deflocculation just ahead of the paper-making machine.

Although a variety of different types of screens and other cleaning devices have been developed, most of this equipment falls into one of three main groups, namely vibrating screens, centrifugal screens and vortex cleaners. There is also a special group of screening devices that falls in the class of fractionators, the purpose of the special screens being to separate particles of smaller dimensions than the fibers from the suspension.

One type of vibrating screen is the flat plate screen which includes a horizontal screen plate over which, or below which, the pulp suspension is caused to flow and in which the openings are kept clean by vibration of the screen to create back pressure. The principal disadvantage of flat plate vibrating screens is their low capacity in relation to the floor space requirements and the high costs of acquisition, operation, maintenance and repair. Because of those and other disadvantages, flat plate vibrating screens have for the most part been discarded by the industry except for coarse screening.

Another type of vibrating screen is the drum type, which consists of a slowly rotating screen drum that is partially submerged in a pulp vat. The pulp is screened from the outside to the inside of the drum, and the drum is vibrated radially. Drum-type vibrating screens have basically the same disadvantages as the flat plate vibrating screens except that they do not require quite as much plant floor space. Also, the tendency for them to foam is not as great as it is in plate screens.

In centrifugal screens the pulp suspension, usually called the inject, is caused to flow tangentially, but with a relatively small axial velocity component, into a cylindrical screen drum by means of rotating vanes or blades. Centrifugal screens may be of either the open type, in which the screen is only partly full of the inject, or of the pressure type, in which the screen is completely full of the inject.

In open centrifugal screens, a shaft carrying the blades rotates inside a horizontally disposed screen basket, and the pulp suspension (the inject) is delivered to the basket at one end. The separated impurities, called the reject, are withdrawn from the other end of the screen, while the screen pulp suspension, the accept, is collected in a vat under the screen basket. Cleaning of the screen surfaces is obtained by pulsations in the flow created by the vanes or blades sweeping along the screen surface. The vanes are usually oblique to the drum to facilitate removing the reject from the basket. Variations of this basic type of centrifugal screen involve either a rotatable screen basket with fixed blades, or a vertical disposition of the axis of the screen basket. Among the disadvantages of open centrifugal screens is their high tendency to foam and also their sensitivity to variations in the load.

In pressure-type centrifugal screens, the pulp suspension is fed tangentially into a vertical screen drum in a manner providing a rotational flow of the pulp suspension within the screen. The accept is removed from outside of the screen, the screening being assisted by the centrifugal forces of the rotational flow, and the reject is withdrawn from the bottom of the screen. The screen is kept clean by moving blades located within the screen basket. One problem with pressure-type centrifugal screens is the tendency for the screen plates to become plugged up, especially when the cleaning blades are not precisely located or are not moving at exactly the right speed. Also, the quality of the screening action is not particularly good.

Vortex cleaners are cleaning devices employing, as their only operating principle, the separation effect of a centrifugal field. They are, of course, not screens, but because vortex cleaners are being used in some instances for the same purposes as screens, they are related somewhat to the problem which the present invention solves. In a vortex cleaner, the inject is caused to rotate in a cylindrical vessel by a high inflow velocity, the inflow being tangentially into the upper part of the vessel. The flow through the vessel is in the form of (1) an outer vortex with a substantially constant angular velocity across the vessel, except for a thin film at the wall of the vessel, and (2) an inner vortex having a velocity gradient that increases moving toward the center. By withdrawing the inner vortex through the so-called "vortex finder," a separation of a portion of the suspension containing particles having a sedimentation velocity less than a predetermined value established by the design of the cleaner is obtained. The main flow in the cleaner continues spirally toward the reject outlet in the lower part of the vessel. The suspension in the outer vortex moves into the inner vortex at various places along its axis, and thus the accepted suspension, which is withdrawn from the inner vortex, contains particles having various retention times and therefore different degrees of conformity to the desired characteristics.

Vortex cleaners have a number of disadvantages. For one thing, because the separation depends primarily on the geometrical design of the cleaner, it is necessary to tailor-make a separator fairly precisely to meet given separation requirements. Furthermore, good separation requires pulp suspensions of low concentration, thereby requiring large amounts of fluid to be handled. Vortex cleaners also require high pressures, which added to the requirement for high fluid capacity, means high power consumption. Moreover, the diluted suspension will later require a high drainage capacity.

To summarize the background of the invention, studies of the cleaning and separation processes carried out by presently known equipment reveal the following conditions:

(1) In vibrating screens, separation of unacceptable particles takes place primarily because of the obstructions to the passage of large particles presented by the screen. With flow parallel to a flat screen plate and a velocity gradient near the plate, a selectively acting, apparent decrease in the hole size is obtained so that the passage of heavier, elongated particles is prevented. The cleaning of plugged holes is obtained by periodic back-pressure flow through the screen plate.

(2) In centrifugal screens cleaning and separation are accomplished not only by screening as with vibrating screens but also by the separating effect of a centrifugal field, which causes particles with sedimentation velocities exceeding a predetermined value to be propelled toward the screen drum while particles with lower sedimentation velocities are held in suspension by secondary flows taking place in the rotational flow. In centrifugal screens the accept is enriched with particles of high sedimentation velocity and dimensions small enough to permit them to pass through the screen. The plugging of the screen can take place because of so-called splinters, which become lodged in the holes, as well as by fibers folded over the edges of the holes, and cleaning of the plugged holes is obtained by a combination of high velocity flow gradients parallel to the screen and pressure decreases across the screen caused by the disturbances of the balance of forces across the plugged hole. There is no back flow through the holes, however.

(3) A very important feature of a screening operation is the continuous breakdown of fiber networks which would otherwise impede or completely prevent the movement of particles through the suspension. If there is a flocculation in the screen, still another type of particle is formed with characteristics quite different from the others, so that both screening effectiveness and cleaning capacity are jeopardized. If proper operation is to be obtained with vibrating screens, the concentration of the pulp suspension must be lower than for centrifugal screens, because the shear fields that operate to destroy fiber networks are not as strong in vibrating screens. Centrifugal separators, on the other hand, function better with higher concentrations, inasmuch as the shear forces are higher and the vortex characteristics of the flow are attenuated by the particles.

(4) The trend in the pulp and paper industry is toward larger production units, and this has created a need for completely closed, liquid-filled units with high capacity and minimum plant space requirements. Low capacity vibrating screens fail to meet these requirements, except for purposes of coarse screening, that is with large openings in the screen plates. Open centrifugal screens similarly have low per-unit capacities and high space requirements and also do not provide separation of short unacceptable particles, such as sand, bark specks and the like. Also, open centrifugal screens tend to create frothing, i.e., the mixing of excessive quantities of air into the pulp suspension, thus making their use for such purposes as hot-stock cleaning and final screening immediately upstream of the paper machine, impossible.

(5) Pressure centrifugal machines do not have the disadvantages of sizes or capacity but they do not provide good results and are thus not useful where high quality is required.

(6) A screen becomes more heavily laden with impurities and its capacity is decreased accordingly as increased sliver concentrations occur in the pulp suspension. The impurities not only decrease the effective open area through the screen plates but also create a greater tendency for plugging to occur. Because of a greater concentration of impurities on the screen plate, every pulse of back flow pressure through the screen to clean it results in turbulence in the layer of impurities with a consequent greater risk for sliver breakthrough to occur. This adverse effect on screening efficiency is further intensified if the cleaning vanes or blades are located on the inject side of the screen plate. The accept will also be enriched with particles of small dimensions and high sedimentation velocity. Because of their greater concentration, the impurities are more difficult to remove quickly from the screen, thus adversely affecting retention time. The quantity of reject and the concentration of impurities have, thus, extremely important effects on screening efficiency.

SUMMARY OF THE INVENTION

There is provided, in accordance with the present invention, apparatus for cleaning and fractionating a pulp suspension which overcomes the disadvantages of presently known pulp cleaning devices discussed above and, further, provides significant advantages, including considerably increased capacity in each unit, large reductions in the number of screening stages required in pulp preparation, high efficiency, and low acquisition, operation and maintenance costs.

More particularly, the cleaning and fractionating apparatus of the present invention comprises a closed vessel which includes an annular outer wall, an annular drum structure within the vessel and positioned coaxially with the outer wall, the drum structure including one or more annular screens, also disposed coaxially with the outer wall, an inlet for introducing the suspension into the vessel and conducting it to the space between the outer wall and the drum structure and outlets for the reject and the accept portions of the suspension.

The annular drum structure is rotated and maintains a Couette flow in the space between it and the outer wall of the vessel. The centrifugal forces exerted on the particles by the Couette flow cause a separation of the particle suspension into (1) a portion enriched with unacceptable particles having comparatively high sedimentation velocities which are driven toward the outer wall and removed by drawing off the outer layer of the Couette flow and (2) a portion which contains acceptable particles and particles having essentially the same sedimentation velocities as the acceptable particles. The latter portion of the suspension is screened, the accept passing inwardly into the drum for removal and the reject from the screen, mainly oversized particles, being withdrawn with the centrifugally removed portion of the reject.

The outlet for removal of the outer layer of the Couette flow (which contains the part of the reject constituted by particles with high sedimentation velocities and oversize particles) is located adjacent the outer wall of the vessel and includes an annular orifice providing a substantially uniform outflow of the reject about the perimeter of the vessel into a scroll. The outlet for the accept portion, that part of the inject suspension that passes through the screen, is drawn through an outlet section of the vessel located inside the region of the vessel bounded by the screen drum. One or more fixed vanes or blades located inside the screen drum, and in close proximity to the annular screen, create pulses of back pressure through the screen openings, as the screen sweeps by the blades, to keep the openings clear.

The pulp suspension, the inject, is supplied to the apparatus in such a way as to provide smooth, uniform inflow entirely about the perimeter of the vessel into the space between the outer wall and the screen drum. For example, the inlet section can be arranged to introduce the inject at the central axis of the vessel and to conduct it radially outwardly along a path traversing the end of the rotating annular screen drum structure, blades or vanes on the drum structure and projecting into the inlet section impart rotational flow to the inject having a velocity closely approximating the average velocity of the Couette flow in the separating section of the vessel.

The apparatus of the invention is thus based on fundamentally new principles of cleaning and fractionating a pulp suspension in which the accept is conducted from a rotating Couette flow radially inward through a screen body to the inside of a rotatable screen drum structure and is thus screened to remove oversized particles while particles having sedimentation velocities higher than those of the accept particle are propelled outwardly by centrifugal force toward the outer wall of the vessel for removal through the reject outlet. Thus the apparatus of the invention operates on a combination of principles such that a greater portion of impurities and impurities falling with a wider range of varying characteristics are efficiently removed and a higher quality accept is obtained than has been possible using previously known equipment.

DESCRIPTION OF THE DRAWINGS

For a better understanding of the invention, reference may be made to the following description of exemplary embodiments, taken in conjunction with the figures of the accompanying drawings, in which.

DESCRIPTION OF EXEMPLARY EMBODIMENTS

Figure 1:
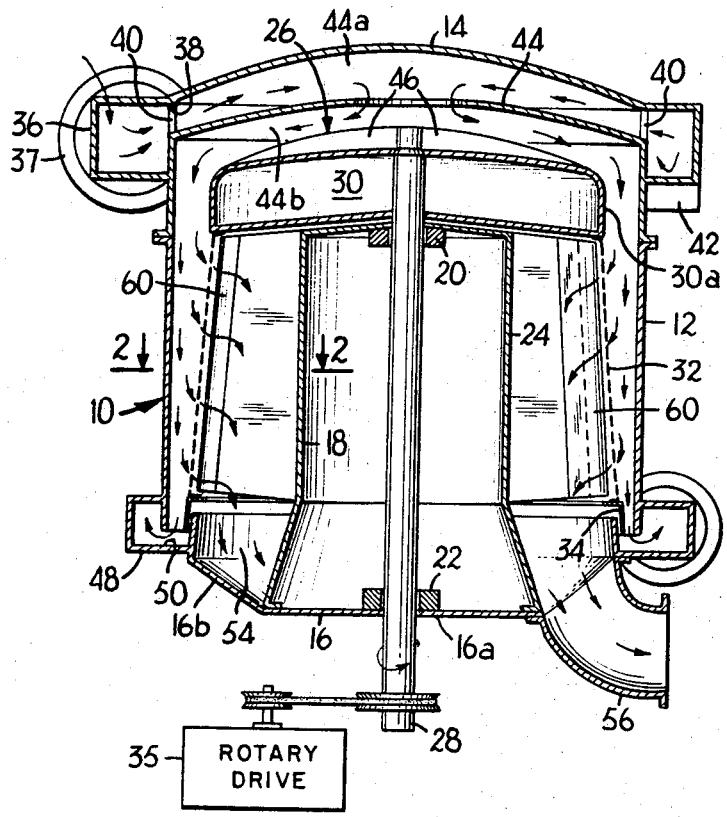
FIG. 1 is a vertical sectional view taken generally through the axis of one embodiment of the invention, the apparatus being shown schematically.
Figure 2:
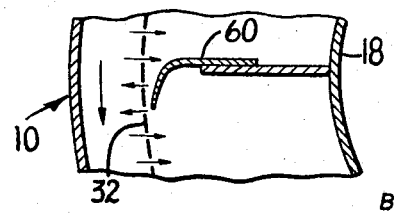
FIG. 2 is a top view in section of a segment of the apparatus of FIG. 1 as represented by the lines 2—2 of FIG. 1, the view being taken in the direction indicated by the arrows.
Figure 3:
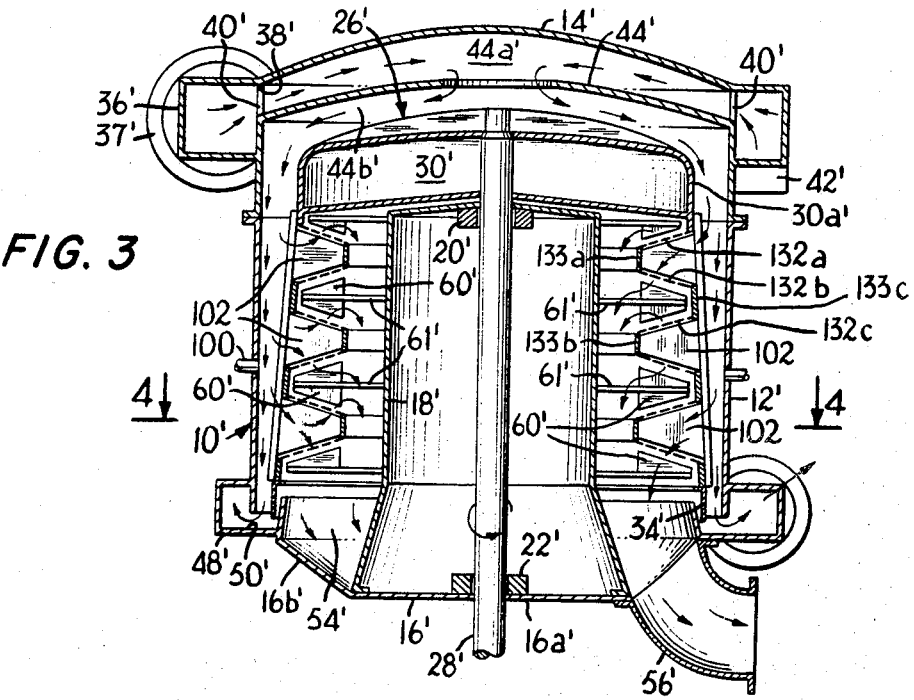
FIG. 3 is a vertical sectional view taken through the axis of another embodiment of the invention, the apparatus being again illustrated schematically.
Figure 4:
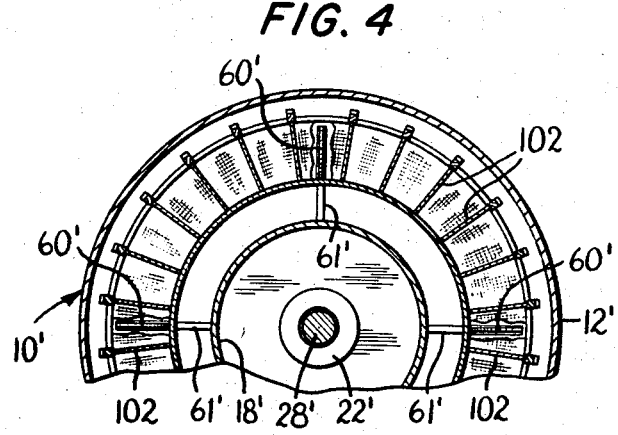
FIG. 4 is a partial cross-sectional view of the embodiment of FIG. 3 taken generally along the lines 4—4 of FIG. 3 and looking in the direction of the arrows.

The embodiment of the invention shown in FIGS. 3 and 4 is quite similar to the embodiment of FIGS. 1 and 2, except for the construction of the rotary screen drum structure. Accordingly, the following description is applicable to both embodiments, except where otherwise indicated, and the corresponding parts of the two embodiments are identified by the same reference numerals, except that a prime suffix is appended to the numerals designating the parts of the embodiment of FIGS. 3 and 4. The manner in which the embodiment of FIGS. 3 and 4 differs from the embodiment of FIGS. 1 and 2 is, of course, discussed specifically below.

In the embodiments shown in the drawings, the apparatus of the invention comprises a vessel 10 which includes a cylindrical outer wall 12, a dome-shaped upper wall or top 14 and a lower wall or bottom 16 composed of a flat central portion 16a and a frusto-conical outer portion 16b. Located within the vessel 10 is a fixed generally cylindrical structure 18 which defines with the cylindrical outer wall 12 of the vessel an annular chamber 24, and also carries upper and lower bearings 20 and 22.

Mounted within the vessel 10 is a rotatable screen drum structure 26 which includes a central carrier shaft 28 journaled in the bearings 20 and 22, a generally cylindrical body 30 affixed to the upper end of the shaft, an annular screen 32 mounted on and depending from the perimeter of the body 30, and an unperforated ring 34 at the lower end of the screen. The drum structure is rotated by a suitable rotary drive 35, as indicated schematically in the drawings, coupled to the shaft 28.

The pulp suspension to be cleaned and fractionated, i.e., the inject, is introduced into the vessel through a scroll 36 surrounding the upper part of the vessel and communicating along its entire length with the interior of the vessel through an orifice 38. The scroll has a diminishing cross-section, moving downstream along its length from the entrance pipe 37, so that the inject flows uniformly and smoothly into the vessel in all radial directions. Relatively large impurities entering the apparatus are kept from intruding into the vessel by combination screen and guide bars 40 closely spaced around the perimeter of the vessel in the orifice 38; the bars 40 are also designed not only to keep large impurities out of the vessel but also to guide the inject smoothly in a radially inward flow into the vessel. The pieces that are kept from entering the vessel by the bars 40 are collected in one or more traps 42 in the bottom of the scroll, the traps being provided with cleanouts for periodic removal of the accumulations.

The inject flows into the vessel in a substantially radial direction but gradually acquires a circumferential component under the influence of the flow conditions obtaining within the vessel. The vessel includes an inlet structure constituted by an annular divider member 44 which subdivides the inlet section of the vessel 10 into a pair of annular inlet passages, an upper passage 44a in which the flow is radially inward and a lower passage 44b in which the inject flow is radially outward.

As the inject flows radially outward through the lower passage 44b (defined between the annular divider member 44 and the upper surface of the cylindrical body 30 of the rotary screen drum), a circumferential flow component is established by means of a plurality of circumferentially spaced-apart impeller vanes 46 projecting up from the top of the body 30. Accordingly, as the inject turns downwardly toward the annular chamber of the vessel, it has a substantial circumferential flow velocity. Preferably, the rotational flow of the inject as it turns down into the annular Couette flow zone between the screen drum and the outer wall 12 of the vessel, should have a velocity approximately equal to one half of the linear speed of the drum surface, this velocity being close to the median velocity of the Couette flow velocity gradient.

Upon passing to the lower end of a transitional zone constituted by the annular space between the outer cylindrical wall 12 of the vessel and the cylindrical outer wall 30a of the drum body 30, the flow of the inject is a Couette flow having parameters approximating those which will be maintained, as described immediately below, in the zone between the screen and the vessel outer wall.

The rotating flow of the inject as it enters and flows down through the annular zone between the screen and the vessel wall causes particles having sedimentation velocities exceeding a predetermined value to be driven by centrifugal force outwardly toward the inner surface of the vessel wall, and such particles will move downwardly along the wall for removal through an outlet scroll 48. An orifice 50 communicating the lower end of the vessel with the scroll 48 is designed with a gradated width so that reject is withdrawn at a uniform rate about the perimeter of the lower end of the vessel.

As the inject moves downwardly, its axial component is relatively low as compared to the average rotational velocity component, and as it enters the Couette flow space defined between the screen 32 and the cylindrical outer wall 12, there is a substantially straight-line velocity gradient in the body of fluid between the screen and wall. This velocity gradient (inherent in the Couette flow) provides an excellent separating effect because the circumferential velocity of the flow increases at points nearer the screen so that the centrifugal acceleration acting on heavier particles increases as they approach the screen. Moreover, the Couette flow also promotes a secondary flow condition known as Taylor's vortices, which tends to break up fiber networks and thereby facilitate the separation of impurities from the pulp suspension. The Taylor's vortices also help maintain the acceptable particles of the inject in relatively uniform suspension.

In the Couette flow zone the radially inner portion of the suspension is forced by the differential pressure between the inject inlet and accept outlet (described below) inwardly through the screen 32 and passes down through an outlet chamber 54 defined in the lower part of the vessel within the screen structure for withdrawal through an outlet pipe 56. Unacceptable particles, mainly those of larger size than the accept particles but having comparable sedimentation velocities, in this part of the suspension are of course excluded from the accept by the screen and pass down and out of the vessel through the reject outlet scroll 48.

The annular space defined between the unperforated ring 34 at the lower end of the screen drum and the lower end of the vessel outer wall 12 constitutes a transitional zone for isolating the Couette flow zone from the flow conditions existing in the reject outlet section of the apparatus.

The screen 32 is kept clean primarily by means of pulses of back pressure through the openings in the plate which are created by pressure build-up in the wedge-shaped slot formed between the inner surface of the screen and one or more axially or helically disposed vanes or blades affixed to the central cylindrical structure 24, as best shown in FIG. 2. Cleaning is facilitated, moreover, by the centrifugal forces of the Couette flow and the relatively steep velocity gradient in the suspension immediately exteriorly of the screen.

The design of the inlet section of the apparatus is of some importance, inasmuch as the inject should reach the Couette flow stage with a uniform and smooth rotational flow having parameters closely approximating the Couette flow. In the embodiments shown in the drawings, the radially inward flow of the inject through the passages 44a is increasingly given a tangential component as it moves in toward the opening, and preferably the inject flow, when it reaches the opening, will have a tangential velocity approximately the same as the rotational velocity of the screen drum. As the inject flows along the passage 44a, air is separated from the suspension and is released from the vessel through a suitable venting arrangement (not shown).

As the inject flows outwardly through the inlet passage 44b, it is accelerated tangentially and, depending upon the dimensioning and the shape of the passage 44b, the radial velocity of the inject can be made to vary beneficially, such as in a sequence involving retardation, acceleration and retardation. As the inject turns downwardly from the passage 44b toward the Couette flow zone, the separation of impurities and the breakdown of fiber networks is further facilitated by the change in direction required by the turn. The velocity variations in the passage 44b should be kept within values such that flow disturbances occurring in the flow where it changes direction will be negligible.

The inlet section of the apparatus can be modified in various ways to perform different functions or to accomplish the same functions in different was. For example, the rods or bars 40 in the inlet orifice may be replaced by an annular perforated plate. Also, the annular divider member 44 between the inlet passage sections 44a and 44b can be mounted on the screen drum for rotation with it, this change providing somewhat different entry-flow conditions.

As mentioned above, the embodiment of the invention illustrated in FIGS. 3 and 4 is quite similar to the embodiment shown in FIGS. 1 and 2 and operates on the same principles. The principal difference resides in a modified form of screen drum structure. More particularly, the screen part of the drum is composed of several frusto-conical screen sections 132a, 132b, 132c, etc. the sections being joined at their respective inner and outer ends by rings 133a, 133b, etc. In order to maintain an optimum width of the Couette flow, the screen drum has a series of radially or helically disposed vanes 102 spaced at relatively close intervals around its circumference. The closely-spaced vanes 102 act essentially in the same way as an annular surface and are effective to maintain a Couette flow in the zone between an imaginary annular surface defined by the outer tips of the vanes and the inner surface of the outer wall 12' of the vessel.

To accommodate the modified structure of the screen drum, the fixed blades or vanes 60' carried by the central cylindrical body 18' are composed of rods 61' carrying individual blades formed to match the adjacent pairs of frusto-conical screen elements.

Where the apparatus is used to process certain types of particles suspensions, it may be appropriate to add water to the suspension in the Couette flow section. This may be accomplished, as illustrated in FIG. 3, by providing water inlets 100, the inlets being designed to inject water in such a way that disturbance of the flow is minimized.

As mentioned above, the blades or vanes 102 may be slightly helically disposed on the screen drum, in other words, positioned at a slight angle to the axial planes of the screen drum. The helical form of vanes will reduce the retention time of the screened impurities by tending to impart a higher axial velocity component to them. A similar result can be obtained by providing one or more additional reject outlets spaced from the bottom outlet.

In both embodiments of the invention, as illustrated in the drawings, the Couette flow zone is defined by axially downwardly converging surfaces, thus reducing the thickness of the Couette flow moving toward the lower end of the zone. This arrangement provides better operation of the apparatus by taking into account the increase in solids content of the suspension at lower levels in the vessel. It will be apparent that the same result can be provided by making the outer wall of the vessel frusto-conical (converging downwardly) and the screen drum cylindrical. It is unnecessary, however, for the Couette flow zone to be tapered, and good results can be obtained with a zone of uniform thickness defined by cylindrical elements. Moreover, both the vessel outer wall and the screen drum can be frusto-conical to provide a Couette flow section of uniform width or tapered, as may be desired.

The above described embodiments of the invention are intended to be merely exemplary, and those skilled in the art will be able to make numerous variations and modifications of them without departing from the spirit and scope of the invention. All such modifications and variations are intended to be included within the scope of the invention as defined in the appended claims.

I claim:
1. Apparatus for cleaning and fractionating a pulp suspension in which undesired particles having higher sedimentation velocities and undesired particles having larger dimensions than desired are separated from the suspension comprising means defining a vessel for the suspension including an annular outer wall, an annular screen drum structure within the vessel and disposed coaxially with the vessel outer wall and having means constituting effectively a surface capable of maintaining a Couette flow in an annular flow space defined between the said means and the vessel outer wall, the annular flow space being free of obstructions that would interfere with the Couette flow therein, means for introducing the pulp suspension into the annular flow space, means for rotating the screen drum structure to maintain a Couette flow of the particle suspension in the annular flow space such that undesired particles with relatively high sedimentation velocities are driven by centrifugal forces toward the vessel outer wall, the remaining part of the suspension being screened with an accept portion passing inwardly through the screen from the annular flow space, vane means located within the annular screen drum structure for creating pressure pulsations through the screen to clean the screen openings upon rotation of the structure relative thereto, means adjacent the vessel outer wall for withdrawing a reject portion of the suspension including the undesired particles from the chamber, and means for withdrawing the screened accept portion of the suspension from a part of the vessel within the annular screen drum structure.

2. Apparatus according to claim 1 wherein the means for introducing the suspension into the vessel provides an annular flow stream substantially uniformly distributed about the axis of the annular flow space.

3. Apparatus according to claim 2 wherein the means for introducing the suspension into the vessel further includes means along the path of inflow to the annular flow space between the vessel outer wall and the annular screen drum structure for establishing a rotational flow of the suspension having characteristics closely resembling the Couette flow conditions that are maintained in the annular flow space.

4. Apparatus according to claim 3 wherein the means for establishing rotational flow includes impeller means on the rotary screen drum structure.

5. Apparatus according to claim 4 wherein the means for establishing rotational flow includes a plurality of impeller vanes carried by the rotatable annular structure in the inflow space for imparting a substantial circumferential component to the inflowing suspension.

6. Apparatus according to claim 1 wherein the means constituting effectively a surface capable of maintaining a Couette flow includes substantially the annular screen.

7. Apparatus according to claim 1 wherein there is a plurality of annular screen drums of frusto-conical shape coupled together, and wherein the means constituting effectively a surface capable of maintaining a Couette flow includes a plurality of radial vanes disposed generally lengthwise on the drum and distributed at close intervals around the drum.

References Cited

UNITED STATES PATENTS

| | | | |
|---|---|---|---|
| 3,311,235 | 3/1967 | Ahlfors et al. | 209—270 |
| 2,450,838 | 10/1948 | Mathewson | 209—270 X |

DONALL H. SYLVESTER, *Primary Examiner.*

A. C. HODGSON, *Assistant Examiner.*